No. 643,844. Patented Feb. 20, 1900.
D. HOLFORD.
DEVICE FOR SUPPORTING HORSES' HEADS.
(Application filed Apr. 17, 1899.)
(No Model.) 2 Sheets—Sheet 2.

Witnesses:

David Holford, Inventor
By Marion & Marion
Attorneys

UNITED STATES PATENT OFFICE.

DAVID HOLFORD, OF BRITLE, CANADA.

DEVICE FOR SUPPORTING HORSES' HEADS.

SPECIFICATION forming part of Letters Patent No. 643,844, dated February 20, 1900.

Application filed April 17, 1899. Serial No. 713,429. (No model.)

*To all whom it may concern:*

Be it known that I, DAVID HOLFORD, a subject of Her Majesty the Queen of Great Britain, residing at Britle, county of Shoal Lake, Province of Manitoba, Canada, have invented certain new and useful Improvements in Harness Attachments; and I do hereby declare that the following is a full, clear, and exact description of the invention, such as will enable others skilled in the art to which it appertains to make and use the same.

My invention relates to harness attachments, and has for its object to provide a simple and effective device of this kind to be attached to the hames at one end and to the bit at the other for the purpose of preventing the horse from lowering his head sufficiently to permit him to kick or plunge, with resulting injury to the vehicle and occupants.

To this end the invention consists of a device constructed and arranged substantially as hereinafter illustrated, described, and defined in the annexed claim.

It is well known to all who are familiar with horses and their habits that when a horse becomes unruly the first movement is to lower his head, and unless he can do so it will be impossible for the horse to kick or plunge or even to run away. The great value of my invention, simple in construction though it be, will be obvious to all having to do with horses.

Figure 1:
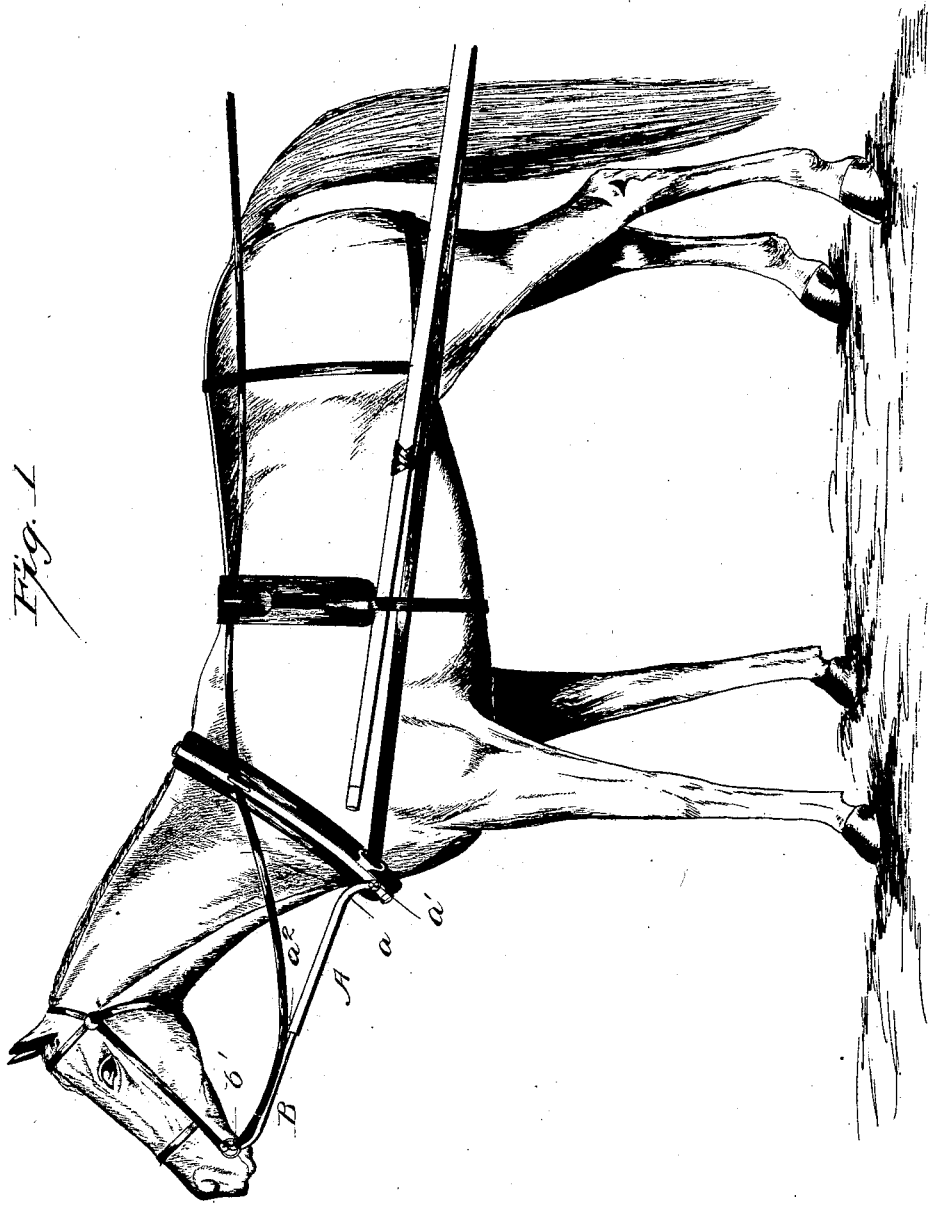
Figure 2:
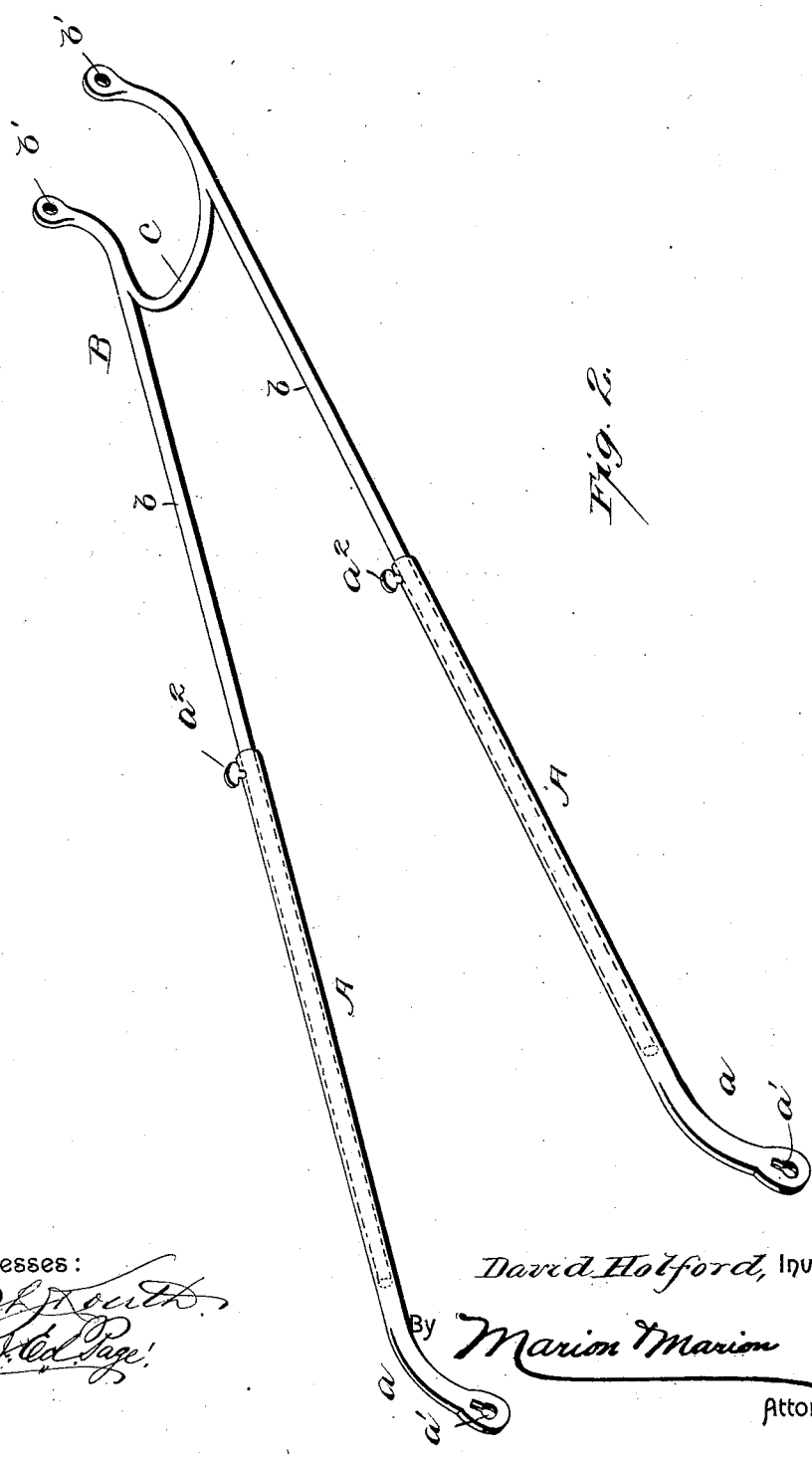

Referring to the drawings, in which similar letters of reference refer to corresponding parts, Figure 1 is a side view of the improvement, showing it applied in operative position on a horse; and Fig. 2 is a perspective view of the improvement, showing the details of construction.

Referring to the drawings, A A represent metal rods of any suitable weight and shape, having their inner ends $a$ curved downwardly and preferably flattened, as shown. In the extremity of the curved ends $a$ is formed a keyhole-slot $a'$, by means of which the device may be removably attached to the hames. The other ends of the rods A A are formed tubular for the greater portion of their length, and at a suitable point the tubular portions are provided with a set-screw $a^2$. Within the tubular portion of the rods A A are adjustably sleeved the arms $b\ b$ of the yoke-shaped frame B, which, like the rods A A, may be of any size or shape suitable for the intended purpose. The arms $b\ b$ are rigidly secured together by an inwardly-curved transverse connecting-bar C. Beyond the point of connection between the arms $b\ b$ and the bar C the said arms $b\ b$ are extended and upwardly curved and are provided at their extremities with perforations or orifices $b'$, whereby they may be attached to the ends of the bit-bar.

In carrying my invention into effect the ends of the rods A A are secured, by means of the keyhole-slot, to the sides of the hames, and the outer ends of the arms $b\ b$ are secured to the ends of the bit-bar or other part of the bridle by any suitable means. The arms $b\ b$ are then properly adjusted in the tubular rods A A, and when the attachment is in position the bar C is located just back of the lower end of the muzzle of the horse, and as the connection between the bit-bar and the hames is practically rigid it will be seen that it is impossible for the horse to lower his head, and he is therefore and by reason of this fact utterly prevented from becoming unruly.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

A harness attachment constructed of two rigid rods having at one end means for rigidly attaching the said rods to the hames and tubular at the opposite ends; a yoke-frame having two rigid arms adapted to be adjusted in the tubular portion of the said rods; means for fastening the said arms in their adjusted position; a connecting-bar between said arms, said arms terminating in upwardly-curved ends; and means for attaching said ends to the bridle or bit, substantially as described.

In witness whereof I have hereunto set my hand in the presence of two witnesses.

DAVID HOLFORD.

Witnesses:
 JOHN LANE,
 A. H. FITZPATRICK.